G. T. JOHNSON.
SAW STRUCTURE.
APPLICATION FILED MAY 31, 1916.
1,278,814.
Patented Sept. 10, 1918.
3 SHEETS—SHEET 1.
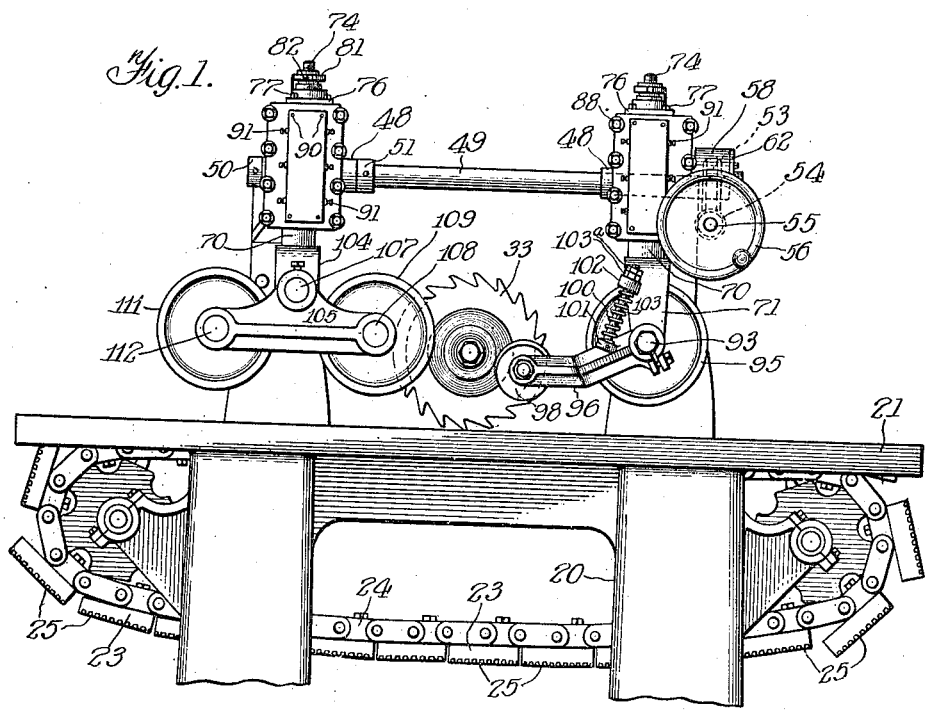
Inventor
Gustave T. Johnson
By Walter M. Fuller
Atty.

G. T. JOHNSON.
SAW STRUCTURE.
APPLICATION FILED MAY 31, 1916.
1,278,814.
Patented Sept. 10, 1918.
3 SHEETS—SHEET 2.
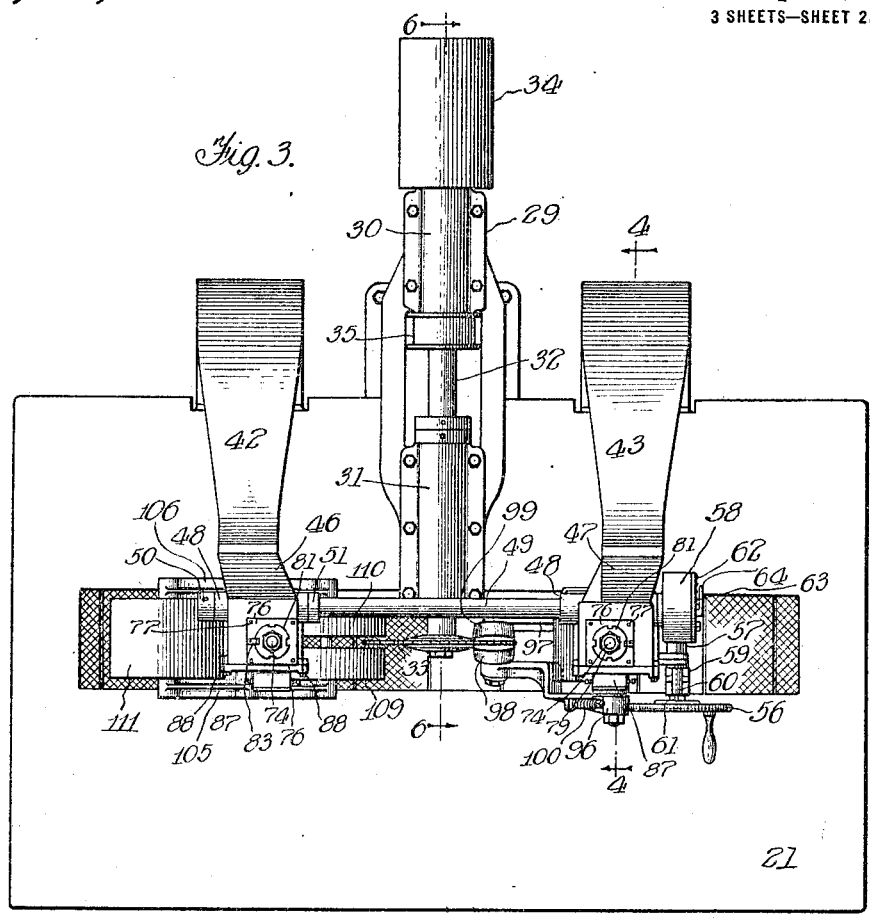
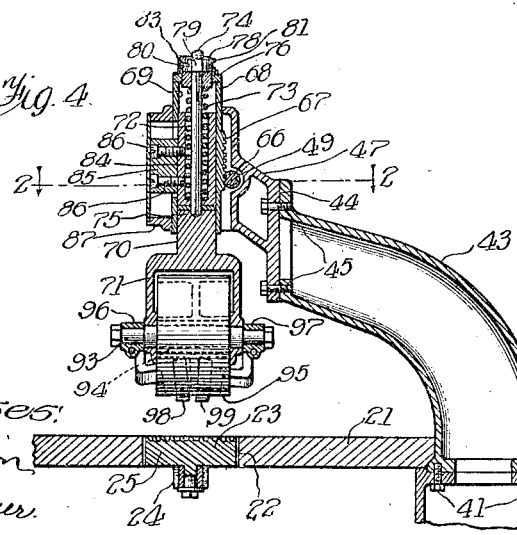

G. T. JOHNSON.
SAW STRUCTURE.
APPLICATION FILED MAY 31, 1916.
1,278,814.
Patented Sept. 10, 1918.
3 SHEETS—SHEET 3.
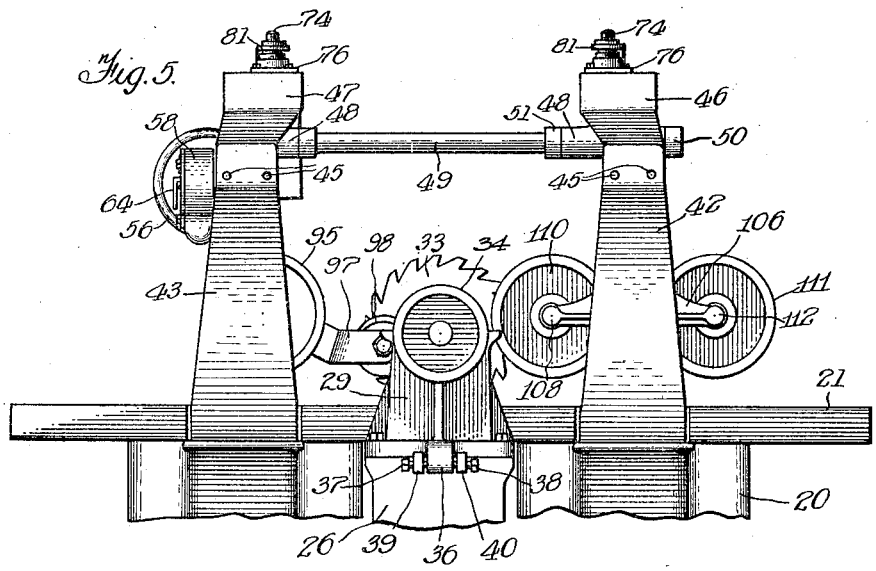
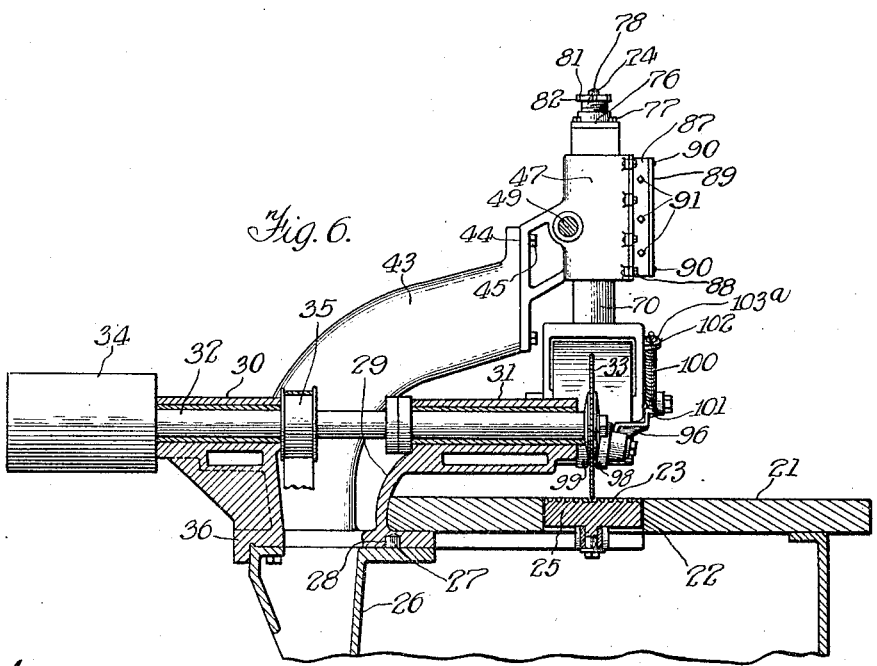

UNITED STATES PATENT OFFICE.

GUSTAVE T. JOHNSON, OF BELOIT, WISCONSIN, ASSIGNOR TO P. B. YATES MACHINE COMPANY, OF BELOIT, WISCONSIN, A CORPORATION OF WISCONSIN.

SAW STRUCTURE.

1,278,814.

Specification of Letters Patent.

Patented Sept. 10, 1918.

Application filed May 31, 1916. Serial No. 100,779.

*To all whom it may concern:*

Be it known that I, GUSTAVE T. JOHNSON, a subject of the King of Sweden, residing at Beloit, in the county of Rock and State of Wisconsin, have invented certain new and useful Improvements in Saw Structures, of which the following is a specification.

My invention pertains to improvements in saws in general, but relates more specifically to certain features of novelty and advantage in relation to the supporting and adjusting means for the saw and its associated pressure-rollers.

One of the prominent points of this invention is the mounting of the saw and its shaft independently of the supporting arms for the associated pressure-rollers, permitting the saw to be adjusted without interference with the independently-adjustable rollers.

In the preferred embodiment of the invention the pressure-rollers in advance of the saw and those rearwardly of the saw are mounted on separate supporting arms, whereby any strains imposed on one set of rollers will not necessarily tend to displace the other set, as would be the case were they mounted on a common support. Furthermore, each group of rollers has its own individual means for truing them with relation to the saw and traveling bed or feeding means. The mounting of the saw is such that it may be angularly adjusted with facility without disturbing any of the rollers and any strains tending to derange the position or adjustment of either will not affect the other.

In order that those skilled in this art may have a full and complete understanding of the invention and its various benefits and advantages, I have illustrated a desirable embodiment of the same in the accompanying drawings forming a part of this specification and throughout the various views of which like reference characters refer to the same parts.

In the drawings:

Figure 1 is a fragmentary elevation of the appliance;

Fig. 2 is an enlarged horizontal section on line 2—2 of Fig. 4;

Fig. 3 is a plan view of the appliance;

Fig. 4 is a cross-section on line 4—4 of Fig. 3;

Fig. 5 is a fragmentary rear elevation of the structure, and

Fig. 6 is a cross-section on line 6—6 of Fig. 3.

The appliance includes a suitable cast-metal supporting framework 20 on which is mounted a table-top 21 longitudinally slotted at 22 for the accommodation of an endless conveyer or feeder 23 driven in any approved manner by means not shown. This conveyer or traveling bed may conveniently be composed of an endless chain 24 equipped with bearing blocks 25, or it may be of any convenient or suitable structure.

At the back of the frame 20 the device has a slide 26 vertically adjustable by means, not shown, and equipped with an upstanding pivot or fulcrum pin 27 fitting in a recess 28 in the bottom of a saw shaft bearing member 29 extended transversely of the table-top substantially centrally thereof and provided with a pair of alined bearings 30 and 31 accommodating a saw shaft 32 on the inner end of which a circular saw 33 is mounted above the center of the endless conveyer or traveling bed. The opposite end of the shaft is supplied with a main drive pulley 34, a smaller power transmitting pulley 35 being mounted on the central portion of the shaft between its bearings.

In order that the saw and its mounting may be angularly adjusted on the pivot 27 and maintained in the desired position, the member 29 is provided with a lug 36 depending therefrom and located between a pair of oppositely-disposed adjusting screws 37, 38, projecting through and threaded in ears 39 and 40 extended rearwardly from and integral with the slide 26. By this means the plane of the saw may be adjusted as circumstances require.

The frame 20 also has mounted thereon by means of securing screws 41, 41, a pair of hollow, upwardly curved, pressure-roller supporting arms 42 and 43 located on opposite sides of the saw-shaft and terminating in vertical faces 44 against which are fastened by screws 45, castings or boxes 46 and 47, the former being on the arm 42 and the latter on arm 43. These boxes have alined bearings 48 disposed transversely thereof and receiving an adjusting shaft 49 provided with suitable holding collars 50, and 51, to prevent lengthwise shifting of the shaft, and at one end the shaft has a worm-wheel 53 in mesh with a worm 54 on a shaft 55 equipped with a turning handle 56.

A casting 57 fastened against a face of the box member 47 has a hollow shell portion 58 housing the worm and co-acting worm-wheel, a bearing portion 59 for the shaft 55, and a vertical arm 60 with a spring-pressed detent or pin 61 coöperating with recesses in the hand-wheel. The face of part 58 is closed by a plate 62 having on its outer surface a graduated scale 63 with which a pointer or index 64 secured to the end of the shaft 49 coöperates.

Shaft 49 at points inside the boxes 46, 47, is cut to provide gear teeth or small gear 66. Inasmuch as the structures inside of these boxes are alike, a description of one will suffice for both.

The pinion or small gear 66, for example, is in mesh with a vertical rack 67 forming an integral part of the back portion of a hollow slide 68 externally square or rectangular in form and slidingly received in the box or casting 47 and adapted to project out of the same either at the top or bottom by reason of apertures in the box for that purpose. Stated somewhat differently, the slide 68 has a suitable bearing in the box permitting its reciprocation therein. The vertical cylindrical bore 69 through such slide, slidingly accommodates the upstanding round shank 70 of a pressure-roller yoke or support 71, the upper portion of such shank being hollow at 72 and receiving a coil spring 73 surrounding a rod 74, the lower end of which is fastened to the shank 70 by a transverse pin 75. The upper open end of slide 68 is closed by a cap 76 held thereon by screws 77 and centrally threaded for the accommodation of a screw-threaded plug 78 adjustable by means of such threaded connection. Spring 73 presses at its lower end against the bottom of cavity 72 and at its upper end bears against the under face of the adjustable plug 78, rod 74 projecting upwardly through a hole in the plug, its upper screw-threaded end having a nut 79 thereon housed in a depression 80 in the top of the plug. Such plug has a flange or circular rib 81 with a series of notches 82 into any one of which a leaf retaining spring 83 is adapted to fit to prevent turning of the plug except when adjustment is desired.

Obviously by turning shaft 49 by means of the hand-wheel 56 both slides 68 and the pressure rollers carried thereby and described hereinafter will be simultaneously and equally elevated or lowered. To adjust the action of the spring on either set of rollers, the operator manipulates nut 79.

To vertically adjust either set of pressure rollers without affecting the other, the workman turns screw-plug 78 first temporarily retracting the holding catch or leaf-spring 83.

It is also possible to independently vary the angular disposition of either set of pressure-rollers by means of the instrumentalities now to be described. The front face of shank 70 is flattened at 84 and to such plane surface a block 85 is secured by screws 86, such block projecting forwardly through a rectangular hole 86ª in the corresponding wall of slide 68 into a cap 87 fastened by screws 88 to the front of the box 47. This cap in turn is closed by a thin sheet-metal cover-plate 89 held thereon by suitable screws 90. The vertical side walls of cap 87 between which block 85 is received are each equipped with three adjustment screws 91, 91, 91, the inner ends of which bear against gibs 91ª on the corresponding faces of the block, the screws being supplied with suitable lock-nuts 92. By proper turning of the screws, the angular position of shank 70, yoke 71, and the pressure-rollers mounted thereon, may be easily varied or adjusted.

The yoke 71 carries a shaft 93 and a roller bearing 94 for the advance pressure-roller 95 positioned between the arms of the yoke. The shaft projects through both of these arms and each protruding end thereof has fastened thereto the split end of a bent supporting arm 96 and 97 respectively terminating near and on opposite sides of the saw. Each arm carries a smaller supplemental tilted pressure-roller 98 and 99 respectively, positioned on the opposite sides of the saw adjacent to the point of cut thereof, and tilted relatively to the plane of the saw with its upper portion farther from the saw than its lower portion. These rollers are thus oppositely inclined to the plane of the saw to permit them to be brought close to the saw and to prevent the wedging of splinters between them and the saw. Although thus inclined, the active surfaces of the rollers are parallel to the horizontal surface of the conveyer or traveling bed. Each arm 96 and 97 has a downwardly pressing coil spring 100 interposed between a boss 101 on the arm and a perforated companion shoulder 102 on the yoke 71. Each spring encircles a rod 103 pinned to the arm and sliding through the hole of the shoulder 102, being equipped on its top protruding end with stop nuts 103ª, which adjust or limit the descent of the roller.

Referring to the pressure-rollers at the rear of the saw, it will be noticed that the shank 70 of the rear arm carries a support 104 at its lower end to the opposite sides of which rocker arms 105 and 106 are secured on the protruding ends of a cross-shaft 107 journaled in the part 104. On a shaft 108 fastened in the advance ends of the spaced arms 105 and 106 a pair of separated pressure-rollers 109, 110, are revolubly mounted, the saw extending into the space between them so as to bring the rollers close to the saw to permit them to adequately perform their holding down function. A single rear pressure-roller 111 is revolubly supported between the arms 105 and 106 on a shaft 112 suitably supported in such arms.

From the illustration and description it should be clear; first, that the two sets of rollers and the saw are mounted on the framework on three independent supports; second, that the saw may be vertically and angularly adjusted without in any way interfering with the rollers; third, that both sets of rollers may be simultaneously and equally adjusted toward and from the traveling conveyer or feeder; fourth, that the spring pressures on the two sets of rollers may be independently regulated; fifth, that the vertical positions of the sets of rollers may be independently varied; sixth, that the angular dispositions of the sets of rollers may be separately secured; seventh, that any strains imposed on the saw or on either group of rollers or their mountings are localized and are not transmitted and do not tend to displace any of the other parts, or, stated differently, the strain on either set of rollers does not disturb the other set or the saw, and any strains on the saw are not transmitted to either set of rollers.

It should be borne in mind that this invention is not limited and restricted to the precise and exact structural features shown and described, because these may be varied within comparatively wide limits without departure from the substance of the invention and without the sacrifice of any of its substantial benefits and advantages.

I claim:

1. In a saw-structure of the character described, the combination of a machine-frame, a saw above said frame, a support for said saw on said frame, a traveling-bed on said frame adapted to feed the work to the saw, a pressure-roller above said traveling-bed at the front of the saw, a second pressure-roller at the rear of the saw above said bed, and separate supporting arms on which said rollers are mounted rigidly fixed on and transversely overhanging said frame, said arms being independent of one another and of said saw support, substantially as described.

2. In a saw-structure of the character described, the combination of a machine-frame, a saw above said frame, a support for said saw on said frame, a traveling-bed on said frame adapted to feed the work to the saw, a pressure-roller at the front of the saw above said traveling-bed, a second pressure-roller at the rear of the saw above said bed, supporting-arms on which said rollers are mounted rigidly fixed on and transversely overhanging said frame, said arms being independent of one another and of said saw-support, and means to simultaneously adjust said pressure-rollers on their independent supporting-arms toward and from said bed, substantially as described.

3. In a saw-structure of the character described, the combination of a machine-frame, a saw above said frame, a traveling-bed on said frame, a support for said saw on said frame, adapted to feed the work to the saw, a pressure-roller at the front of the saw above said traveling-bed, a second pressure-roller at the rear of the saw above said bed, supporting-arms on which said rollers are mounted rigidly fixed on and transversely overhanging said frame, said arms being independent of one another and of said saw support, and means to independently angularly adjust said rollers, substantially as described.

4. In a saw-structure of the character described, the combination of a machine-frame, a saw above said frame, a traveling-bed on said frame, a support for said saw on said frame, adapted to feed the work to the saw, a pressure-roller at the front of the saw above said traveling-bed, a second pressure-roller at the rear of the saw above said traveling-bed, separate supporting-arms on which said rollers are mounted rigidly fixed on and transversely overhanging said frame, said arms being independent of one another and of said saw support, and means to independently adjust said pressure-rollers on their supporting-arms toward and from said bed, substantially as described.

5. In a saw-structure of the character described, the combination of a machine-frame, a saw above said frame, a traveling-bed on said frame, a support for said saw on said frame, adapted to feed the work to the saw, a pressure-roller at the front of the saw above said bed, a second pressure-roller at the rear of the saw above said bed, separate supporting-arms on which said pressure-rollers are mounted rigidly fixed on and transversely overhanging said frame, said arms being independent of one another and of said saw support, means to independently vertically adjust said rollers on said supporting-arms toward and from said bed, and means to simultaneously vertically adjust said pressure-rollers on said arms toward and from said bed, substantially as described.

6. In a saw-structure of the character described, the combination of a machine-frame, a pressure-roller, a second pressure-roller, independent supporting arms on said frame on which said rollers are mounted, means to independently angularly adjust said rollers, means to independently adjust said rollers on said arms toward and from the machine-frame, and means to simultaneously adjust said rollers on said arms toward and from said machine-frame without interference with the other adjustments, substantially as described.

7. In a saw-structure of the character described, the combination of a machine-frame, a saw above said frame, a support for said saw on said frame, a traveling-bed on said frame adapted to feed the work to the saw, a pressure-roller at the front of the saw, a second pressure-roller at the rear of the saw, supporting arms on said frame on which said rollers are mounted, said arms being independent of one another and of said saw support, means to independently angularly adjust said rollers, means to independently adjust said rollers on said arms toward and from the bed, and means to simultaneously adjust said rollers on said arms toward and from the bed without interference with the other adjustments, substantially as described.

8. In a saw-structure of the character described, the combination of a machine-frame, a saw, a mounting for said saw angularly adjustable on said frame, a traveling-bed on said frame adapted to feed the work to the saw, a pressure-roller at the front of the saw above said traveling-bed, a second pressure-roller at the rear of the saw above said traveling-bed, and separate supporting-arms on which said pressure-rollers are mounted rigidly fixed on and transversely overhanging said frame, said arms being independent of one another and of the mounting for the saw, substantially as described.

9. In a saw-structure of the character described, the combination of a machine-frame, a saw above said frame, a traveling-bed on said frame adapted to feed the work to the saw, a mounting for said saw adjustable toward and from the bed and angularly adjustable on said frame, a pressure-roller at the front of the saw above said bed, a pressure-roller at the rear of the saw above said bed, and separate supporting-arms on which said pressure-rollers are mounted rigidly fixed on and transversely overhanging said frame, said roller-supporting arms being independent of one another and of the mounting for the saw, substantially as described.

10. In a saw-structure of the character described, the combination of a machine-frame, a saw above said frame, a mounting for said saw angularly adjustable on said frame, a traveling-bed on said frame adapted to feed the work to the saw, a pressure-roller at the front of the saw above said bed, a second pressure-roller at the rear of the saw above said bed, separate supporting-arms on which said pressure-rollers are mounted rigidly fixed on said frame and transversely overhanging the frame, said arms being independent of one another and of the mounting for the saw, and means to independently angularly adjust said rollers without disturbing the angular adjustment of said saw, substantially as described.

11. In a saw-structure of the character described, the combination of a traveling-bed adapted to feed the work, a suitably-supported boxing, a member slidable in said boxing toward and from the bed prevented from turning in said boxing and having a cylindrical bore, a pressure-roller, a pressure-roller support having a cylindrical shank accommodated in said bore, spring-means acting to press said pressure-roller support toward the bed, means to adjust said member toward and from said bed, and means to angularly adjust said support shank in said bore, substantially as described.

12. In a structure of the character described, the combination of a traveling-bed adapted to feed the work, a suitably-supported boxing, a member slidable in said boxing toward and from said bed prevented from turning in said boxing and having a cylindrical bore, a pressure-roller, a pressure-roller support having a cylindrical shank accommodated in said bore, spring-means acting to press said pressure-roller support toward the bed, means to adjust said member toward and from said bed, means to adjust said shank longitudinally relatively to said member, and means to angularly adjust said support shank in said bore, substantially as described.

13. In a structure of the character described, the combination of a traveling-bed adapted to feed the work, a boxing, a member slidable in said boxing externally angular in cross-section and provided with a cylindrical bore, a pressure-roller, a pressure-roller support having a substantially-cylindrical shank accommodated in said bore, a pressure-spring acting on said shank, a guide-block secured to said shnak, and means coöperating with said guide-block to vary the angle of the plane of said pressure-roller, substantially as described.

14. In a structure of the character described, the combination of a traveling-bed adapted to feed the work, a boxing, a member slidable in said boxing and externally angular in cross-section and provided with a cylindrical bore, a pressure-roller, a pressure-roller support having a substantially-cylindrical shank accommodated in said bore, a pressure-spring acting on said shank, a guide-block secured to said shank, and adjustment screws on opposite sides of said block adapted to vary the angle of the plane of said pressure-roller, substantially as described.

15. In a structure of the character described, the combination of a traveling-bed adapted to feed the work, a boxing, a member slidable in said boxing toward and from said bed, said member being externally angular in cross-section and provided with a cylindrical bore, a pressure-roller, a pressure-roller support having a substantially-cylindrical shank accommodated in said bore, a cap for the top of said bore, an apertured plug threaded through said cap, a screw-threaded supporting-rod secured to said shank and projecting through the aperture of said plug, and an adjusting nut on said rod coöperating with said plug to limit the descent of the pressure-roller, a spring interposed between the plug and shank, and means to vertically adjust said slide member and associated parts, substantially as described.

Signed at Beloit, county of Rock, State of Wisconsin, this 25th day of May, A. D. 1916.

GUSTAVE T. JOHNSON.

Copies of this patent may be obtained for five cents each, by addressing the "Commissioner of Patents, Washington, D. C."

It is hereby certified that in Letters Patent No. 1,278,814, granted September 10, 1918, upon the application of Gustave T. Johnson, of Beloit, Wisconsin, for an improvement in "Saw Structures," errors appear in the printed specification requiring correction as follows: Page 2, line 17, the word "gear," second occurrence, should read *gears;* page 3, lines 76–77, claim 3, lines 91–92, claim 4, and lines 107–108, claim 5, strike out the words "a support for said saw on said frame"; same page, lines 75 and 106, claims 3 and 5, after the word "frame," second occurrence, and line 90, claim 4, after the word "frame," insert the words *a support for said saw on said frame;* same page and claims, lines 77, 92, and 108, before the word "adapted" strike out the comma; page 4, line 111, claim 13, for the word "shnak" read *shank;* and that the said Letters Patent should be read with these corrections therein that the same may conform to the record of the case in the Patent Office.

Signed and sealed this 15th day of October, A. D., 1918.

[SEAL.]

R. F. WHITEHEAD,
*Acting Commissioner of Patents.*

Cl. 193—58.